US009960831B2

(12) United States Patent
Basar

(10) Patent No.: US 9,960,831 B2
(45) Date of Patent: May 1, 2018

(54) MULTIPLE INPUT MULTIPLE OUTPUT ORTHOGONAL FREQUENCY DIVISION MULTIPLEXING WITH INDEX MODULATION, MIMO-OFDM-IM, COMMUNICATIONS SYSTEM

(71) Applicant: ISTANBUL TEKNIK UNIVERSITESI REKTORLUGU, Istanbul (TR)

(72) Inventor: Ertugrul Basar, Istanbul (TR)

(73) Assignee: ISTANBUL TEKNIK UNIVERSITESI REKTORLUGU, Istanbul (TR)

(*) Notice: Subject to any disclaimer, the term of this patent is extended or adjusted under 35 U.S.C. 154(b) by 0 days. days.

(21) Appl. No.: 15/408,432

(22) Filed: Jan. 18, 2017

(65) Prior Publication Data
US 2017/0180032 A1 Jun. 22, 2017

Related U.S. Application Data

(63) Continuation-in-part of application No. PCT/TR2016/050268, filed on Aug. 5, 2016.

(30) Foreign Application Priority Data

Aug. 12, 2015 (TR) .............................. a 2015/09964

(51) Int. Cl.
*H04B 7/08* (2006.01)
*H04B 7/0495* (2017.01)
(Continued)

(52) U.S. Cl.
CPC ......... *H04B 7/0854* (2013.01); *H04B 7/0417* (2013.01); *H04B 7/0452* (2013.01);
(Continued)

(58) Field of Classification Search
CPC .. H04B 7/0854; H04B 7/0417; H04B 7/0452; H04B 7/0495; H04B 7/0617; H04B 7/0619; H04B 7/0671; H04B 7/0894
See application file for complete search history.

(56) References Cited

U.S. PATENT DOCUMENTS

| | | | | |
|---|---|---|---|---|
| 9,209,870 | B1 * | 12/2015 | Nammi | ................ H04B 7/0417 |
| 9,319,114 | B2 * | 4/2016 | Ling | .................... H04B 7/0417 |
| 2005/0052991 | A1 * | 3/2005 | Kadous | ................ H03M 13/33 370/216 |

OTHER PUBLICATIONS

Hui Rong Bai et al: "MIMO-OFDM with interleaved subcarrierindex modulation", 10th International conference on wireless communications, Networking and mobile computing (WICOM 2014), Sep. 26, 2014, pp. 35-37.

(Continued)

*Primary Examiner* — Janice Tieu
(74) *Attorney, Agent, or Firm* — Gokalp Bayramoglu

(57) ABSTRACT

A communication system for the next generation wireless communications technology standards. The communication system architecture is created by the combination of the index modulation technique and the multiple input multiple output orthogonal frequency division multiplexing which eliminates the need to utilize complex equalizers by parsing high speed data strings and transmitting them over multiple orthogonal subcarriers, and allows the bits to be transmitted via active subcarrier indices. The OFDM-IM and multiple input multiple output communication techniques are used in tandem. The communication system can be used in future generation mobile communication systems and standards (5G and beyond), Local Area Network system and standards, terrestrial digital TV system and standards, multi-carrier communication systems and broadband digital communication systems.

3 Claims, 6 Drawing Sheets

(51) Int. Cl.
H04B 7/0452 (2017.01)
H04B 7/0417 (2017.01)
H04B 7/06 (2006.01)

(52) U.S. Cl.
CPC ......... *H04B 7/0495* (2013.01); *H04B 7/0617* (2013.01); *H04B 7/0619* (2013.01); *H04B 7/0671* (2013.01); *H04B 7/0894* (2013.01)

(56) References Cited

OTHER PUBLICATIONS

Basar Ertugrul et al: "Orthogonal frequency division multiplexing with index modulation in the presence of high mobility", IEEE First International Black Sea Conference on Communications and Networking (Blackseacom 2013), Jul. 3, 2013, pp. 147-151.

Xiao Yue et al: "OFDM With Interleaved Subcarrier-Index Modulation", IEEE Communications Letters, vol. 18, No. 8, Aug. 1, 2014, pp. 1447-1450, XP011555716, NJ, US.

Ertugrul Basar et al: "Orthnogonal frequency division multiplexing with index modulation", IEEE Global Communications Conference (Globecom 2012), Dec. 3, 2012, pp. 4741-4746.

\* cited by examiner

| Bits | Indexes | OFDM IM sub blocks |
|---|---|---|
| [0 0] | {1,3} | [$s_1$ 0 $s_2$ 0] |
| [0 1] | {2,4} | [0 $s_1$ 0 $s_2$] |
| [1 0] | {1,4} | [$s_1$ 0 0 $s_2$] |
| [1 1] | {2,3} | [0 $s_1$ $s_2$ 0] |

| Bits | Indexes | OFDM IM sub blocks |
|---|---|---|
| [0 0] | {1,2,3} | [$s_1$  $s_2$  $s_3$  0] |
| [0 1] | {1,2,4} | [$s_1$  $s_2$  0  $s_3$] |
| [1 0] | {1,3,4} | [$s_1$  0  $s_2$  $s_3$] |
| [1 1] | {2,3,4} | [0  $s_1$  $s_2$  $s_3$] |

Figure 7

MULTIPLE INPUT MULTIPLE OUTPUT ORTHOGONAL FREQUENCY DIVISION MULTIPLEXING WITH INDEX MODULATION, MIMO-OFDM-IM, COMMUNICATIONS SYSTEM

CROSS-REFERENCE TO RELATED APPLICATIONS

This application is a Continuation-in-Part of International Application PCT/TR2016/050268 filed on Aug. 5, 2016 which claims priority from a Turkish patent Application No. TR 2015/09964 filed on Aug. 12, 2015.

TECHNICAL FIELD OF THE INVENTION

The present invention relates to a communication system to be applied for the next generation (5G) wireless communications technology standards. The communication system architecture, created by the combination of the index modulation (IM) technique and the multiple input multiple output orthogonal frequency division multiplexing (MIMO-OFDM) which eliminates the need to utilize complex equalizers by parsing high speed data strings and transmitting them over multiple orthogonal subcarriers, allows the bits to be transmitted via active subcarrier indices. The present communication system relates to a particular system wherein the orthogonal frequency division multiplexing with index modulation (OFDM-IM) and multiple input multiple output (MIMO) communication techniques, which form the basis of the recommended invention, are used in tandem and it further relates to a system covering the technical field regarding future generation mobile communication system and standards (5G and beyond), Local Area Network (LAN) system and standards (IEEE 802.11n), terrestrial digital TV system and standards (Digital Video Broadcasting, DVB), multi-carrier communication systems and broadband digital communication systems.

BACKGROUND OF THE INVENTION

In the known state of the art, modern wireless communication systems depend on multiple input multiple output (MIMO) communication systems which allow for significant improvements in channel capacity and error performance compared to single transmit and single receive antenna systems. Use of multiple input multiple output (MIMO) communication systems allow for the improvement of capacity and reliability. In multicarrier communication, orthogonal frequency division multiplexing (OFDM) systems eliminate the need to utilize complex equalizers by parsing high speed data strings and transmit them over multiple orthogonal subcarriers. Due to being able to cope with inter-symbol interference efficiently and to minimize the distorting effects of the channel, the orthogonal frequency division multiplexing (OFDM) technology is used in integration with the multiple input multiple output (MIMO) technology within the current wireless communication standards. Multiple input multiple output orthogonal frequency division multiplexing (MIMO-OFDM) systems utilize spatial multiplexing (V-BLAST) techniques in order to reach high data speeds. However, due to the use of linear filtering methods with low complexity, such as zero forcing (ZF) or minimum mean square error (MMSE) estimator, the diversity effect of the multiple input multiple output (MIMO) channels are removed and the desired decrease in signal to noise ratios necessary for reaching the target bit error ratios are not achieved.

Thus, these type of multiple input multiple output orthogonal frequency division multiplexing (MIMO-OFDM) systems are not able to fully utilize the communication characteristics of multiple input multiple output (MIMO) channels. Due to not having the flexibility and dynamic working structure which may be necessary in 5G networks and due to the fact that information can only be transferred in modulated symbols in subcarriers, it cannot provide a trade-off between spectral efficiency and error performance. Multiple input multiple output (MIMO) and orthogonal frequency division multiplexing with index modulation (OFDM-IM) techniques are not used in tandem for 5G networks.

The studies that can be relevant to the invention can be summarized as follows. Document D1 considers a similar design issue combining MIMO communications systems with OFDM-IM. However, only a single mapping scheme was proposed in D1 that can achieve a very limited spectral efficiency. Furthermore, the minimum mean squared error (MMSE) based detector of D1 does not consider the statistics of the MMSE filtered signals and detects the active subcarriers by the measured subcarrier powers independently from the data symbols carried over the active subcarriers; as a result, it provides a suboptimal solution. Despite the fact that both the detector of D1 and the proposed two detectors of the invention are based on MMSE equalizations, their operation principles are considerably different and these different detectors can provide different system performances. Document D2 considers a single input single output (SISO) OFDM-IM scheme for frequency selective fading channels in the presence of high mobility. MMSE equalization is used to eliminate the interference between different subcarriers due to mobility and LLR calculation is used to detect the active indices. Document D3 considers block interleaving of subcarriers for SISO type OFDM-IM. Document D4 is the landmark study that is also performed by the Inventor and proposed OFDM-IM for SISO frequency selective fading systems by considering maximum likelihood and log-likelihood ratio (LLR) detection.

SUMMARY OF THE INVENTION

A novel communication system is recommended for the next generation (5G and beyond) wireless networks with the present invention that is related to a system wherein index modulation (IM), orthogonal frequency division multiplexing (OFDM) and multiple input multiple output (MIMO) communication systems are used together. The main objectives of utilizing the present system are to achieve a higher energy efficiency, to have the potential to achieve a better error performance in case of utilizing a multiple input multiple output (MIMO) system with less transmit and receive antennas and to provide a trade-off between spectral efficiency and error performance through communicating in a dynamic and flexible structure.

BRIEF DESCRIPTION OF THE DRAWINGS

The drawings and the related descriptions, which are used for the better explanation of the multiple input multiple output orthogonal frequency division multiplexing with index modulation, MIMO-OFDM-IM, communications system developed with the present invention, are provided below.

FIG. 7: Reference Active Indices Selection Table 2

DEFINITIONS OF THE ELEMENTS/SECTIONS/PARTS FORMING THE INVENTION

Figure 1:
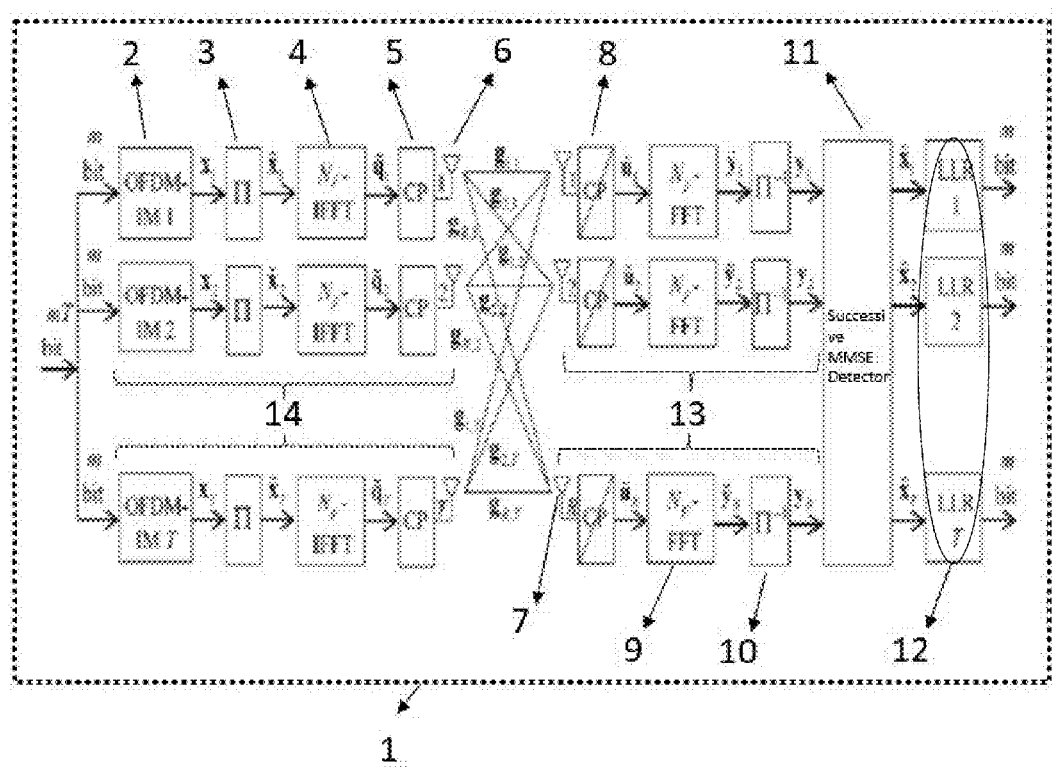
FIG. 1: Transmitter/Receiver Structure of the MIMO-OFDM-IM System
Figure 2:
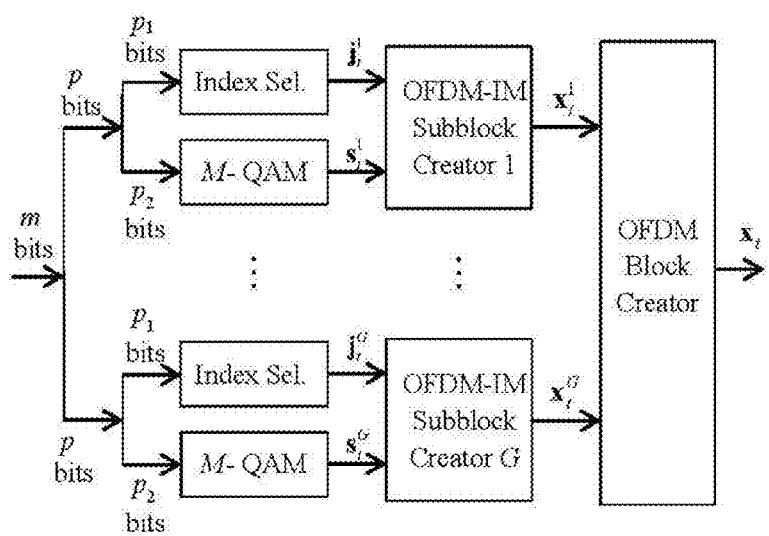
FIG. 2: Block Scheme of the OFDM Index Modulator

The parts and sections, which are presented in the drawings for a better explanation of the wireless communication system developed with the present invention, have been enumerated and the counterpart of each number is presented below.

1. Multiple input multiple output orthogonal frequency division multiplexing with index modulation, MIMO-OFDM-IM, communications system
2. Orthogonal frequency division multiplexing with index modulation (OFDM-IM) blocks
3. Block interleaver (Π)
4. Inverse fast. Fourier transform (IFFT)
5. Cyclic prefix (CP) addition
6. Transmit antennas
7. Receive antennas
8. Cyclic prefix (CP) subtraction
9. Fast Fourier transform (FFT)
10. Block deinterleaver ($\Pi^{-1}$)
11. Successive minimum mean square error (MMSE) detector
12. Log-likelihood ratio (LLR) calculator
13. The Receiver
14. The Transmitter

DETAILED DESCRIPTION OF THE INVENTION

A MIMO system employing transmit and R receive antennas is considered. For the transmission of each frame, a total of riff bits enter the transmitter (14) and first split into groups (14) and the corresponding rte bits are processed in each branch of the transmitter by the OFDM index modulators (2). The incoming in information bits are used to form the $N_F \times 1$ OFDM-IM block $x_t = [x_t(1)\ x_t(2) \ldots x_t(N_F)]^T$, $t=1,2,\ldots,T$ in each branch of the transmitter (2), where $N_F$ is the size of the fast Fourier transform (FFT) (4) and $x_t(n_f) \in \{0,S\}, n_f=1,2,\ldots,N_F$ and S represents the signal constellation. According to the OFDM-IM principle (2), which is carried out simultaneously in each branch of the transmitter, these bits are split into G groups each containing $p=p_1+p_2$ bits, which are used to form OFDM-IM subblocks $x_t^g = [x_t^g(1)\ x_t^g(2) \ldots x_t^g(N)]^T$, $g=1,2,\ldots,G$ of length $N=N_F/G$, where $x_t^g(n) \in \{0,S\}$, $n=1,2,\ldots,N$. According to the corresponding $p_1 = \lfloor \log_2(C(N,K)) \rfloor$ bits, only K out of N available subcarriers are selected as active by the index selector (2) at each subblock g, while the remaining N−K subcarriers are inactive and set to zero. On the other hand, the remaining $p_2 = K\log_2(M)$ bits are mapped onto the considered M-ary signal constellation (2). Active subcarrier index selection is performed by the reference look-up tables at OFDM index modulators (2) of the transmitter (14) for smaller N and K values. The considered reference look-up tables for N=4, K=2 and N=4, K=3 are given in FIGS. 6 and 7, respectively, where $s_k \in S$ for $k=1,2,\ldots K$. For higher and K values, a combinatorial method based index selection algorithm is employed.

The OFDM index modulate (2) in each branch of the transmitter obtain the OFDM-IM subblocks first and then concatenate these G subblocks to form the main OFDM blocks $x_t$, $t=1,2,\ldots,T$. In order to transmit the elements of the subblocks from uncorrelated channels, G×N block interleavers (Π) (3) are employed at the transmitter. The block interleaved OFDM-IM frames $\tilde{x}_t$, $t=1,2,\ldots,T$ are processed by the inverse FFT (IFFT) operators (4) to obtain $\tilde{q}_t$, $t=1,2,\ldots,T$. After the addition of cyclic prefix of $C_p$ samples, parallel-to-serial and digital-to-analog conversions (5), the resulting signals sent simultaneously from T transmit antennas (6) over a frequency selective Rayleigh fading MIMO channel, where $g_{r,t} \in \mathbb{C}^{L \times 1}$ represents the L-tap wireless channel between the transmit antenna t and the receive antenna r. Assuming the wireless channels remain constant during the transmission of a MIMO-OFDM-IM frame and $C_p > L$, after removal of the cyclic prefix (8) and performing FFT operations in each branch of the receiver (9), the input-output relationship of the MIMO-OFDM-IM scheme in the frequency domain is obtained as (13)

$$\tilde{y}_r = \sum_{t=1}^{T} \text{diag}(\tilde{x}_t) h_{r,t} + w_r$$

for $r=1,2,\ldots,R$, where $\tilde{y}_r = [\tilde{y}_r(1)\ \tilde{y}_r(2) \ldots \tilde{y}_r(N_F)]^T$ is the vector of the received signals for receive antenna r (13), $h_{r,t} \in \mathbb{C}^{N_F \times 1}$ represents the frequency response of the wireless channel between the transmit antenna t and receive antenna r, and $w_r \in \mathbb{C}^{N_F \times 1}$ is the vector of noise samples. The elements of $h_{r,t}$ and $w_r$ follow CN (0,1) and CN $(0,N_{0,F})$ distributions, respectively, where $N_{0,F}$ denotes the variance of the noise samples in the frequency domain. We define the signal-to-noise ratio (SNR) as $SNR = E_b/N_{0,T}$ where $E_b = (N_F + C_p)/m$ [joules/bit] is the average transmitted energy per bit.

After block deinterlaving (10) in each branch of the receiver (13), the received signals are obtained for receive antenna r as $$y_r = \sum_{t=1}^{T} \text{diag}(x_t) \check{h}_{r,t} + \check{w}_r$$

Where $\check{h}_{r,t}$ and $\check{w}_r$ are deinterleaved versions of $h_{r,t}$ and $w_{r,t}$ respectively. The detection of the MIMO-OFDM-IM scheme can be performed by the separation of the received signals for each subblock $g=1, 2, \ldots, G$ as follows $$y_r^g = \sum_{t=1}^{T} \text{diag}(x_t^g) \check{h}_{r,t}^g + \check{w}_r^g$$

for $r=1,2,\ldots,R$, where $y_r^g = [y_r^g(1)\ y_r^g(2) \ldots y_r^g(N)]^T$ is the vector of the received signals at receive antenna r (13) for subbblock $g_t$, $x_t^g = [x_t^g(1)\ x_t^g(2) \ldots x_t^g(N)]^T$ is the OFDM-IM subblock g for transmit antenna t (14), and $\check{h}_{r,t}^g = [\check{h}_{r,t}^g(1)\ \check{h}_{r,t}^g(2) \ldots \check{h}_{r,t}^g(N)]^T$ and $\check{w}_r^g = [\check{w}_r^g(1)\ \check{w}_r^g(2) \ldots \check{w}_r^g(M)]^T$. The use of the block interleaving (10) ensures the subcarriers in a subblock are affected from uncorrelated wireless fading channels for practical values of $N_F$.

For the detection of the corresponding OFDM-IM subblocks of different transmit antennas (14), the following MIMO signal model is obtained for subcarrier n of subblock g:

$$\bar{y}_n^g = H_n^g \bar{x}_n^g + \bar{w}_n^g$$

for n=1, 2, ..., N and g=1,2, ..., G, where $\bar{y}_n^g$ is the received signal vector, $H_n^g$ is the corresponding channel matrix which contains the channel coefficients between transmit (6) and receive antennas (7) and assumed to be perfectly known at the receiver, $\bar{x}_n^g$ is the data vector which contains the simultaneously transmitted symbols from all transmit antennas (6) and can have zero terms due to index selection in each branch of the transmitter and $\bar{w}_n^g$ is the noise vector. Due to the index information carried by the subblocks of the proposed scheme, it is not possible to detect the transmitted symbols by only processing $\bar{y}_n^k$ for a given subcarrier n in the MIMO-OFDM-IM scheme. Therefore, N successive MMSE detections (11) are performed for the proposed scheme using the MMSE filtering matrix $$W_n^g = \left((H_n^g)^H H_n^g + \frac{I_T}{\rho}\right)^{-1} (H_n^g)^H$$

for n=1,2, ..., N, where $\rho = \sigma_x^2/N_{0,F}$, $\sigma_x^2 = K/N$ and $E\{\bar{x}_n^g(\bar{x}_n^g)^H\} = \sigma_x^2 I_T$. By the left multiplication of $\bar{y}_n^g$ with $W_n^g$, MMSE detection (11) is performed as $$z_n^g = W_n^g \bar{y}_n^g = W_n^g H_n^g \bar{x}_n^g + W_n^g \bar{w}_n^g$$

where $z_n^g = [z_n^g(1)\ z_n^g(2)\ \ldots\ z_n^g(T)]^T$ is the MMSE estimate of $\bar{x}_n^g$. The MMSE estimate of MIMO-OFDM-IM subblocks $\hat{x}_t^g = [\hat{x}_t^g(1)\ \hat{x}_t^g(2)\ \ldots\ \hat{x}_t^g(N)]^T$ can be obtained by rearranging the elements of $z_n^g$, n=1,2, ..., N as $\hat{x}_t^g = [z_1^g(t)\ z_2^g(t)\ \ldots\ z_N^g(t)]^T$ for t=1,2, ..., T and g=1,2, ..., G. As mentioned earlier, $\hat{x}_t^g$ contains some zero terms, whose positions carry information; therefore, independent detection of the data symbols in $\hat{x}_t^g$ (with linear decoding complexity) is not a straightforward problem for the proposed scheme. As an example, rounding off individually the elements of $\hat{x}_t^g$ to the closest constellation points (the elements of $\{0,S\}$ for the proposed scheme) as in classical MIMO-OFDM may result a catastrophic active index combination that is not included in the reference look-up table, which makes the recovery of index selecting n bits impossible.

In order to determine the active subcarriers in $\hat{x}_t^g$, the LLR detector (12) of the proposed scheme calculates the following ratio which provides information on the active status of the corresponding subcarrier index n of transmit antenna t:

$$\lambda_t^g(n) = \ln \frac{\sum_{m=1}^{M} P(\hat{x}_t^g(n) \mid x_t^g(n) = s_m)}{P(\hat{x}_t^g(n) \mid x_t^g(n) = 0)}$$

for n=1,2, ..., N, where $s_m \in S$. This calculation requires the conditional statistics of $\hat{x}_t^g(n)$ ($z_n^g(t)$). However, due to successive MMSE detection (11), the elements of $\hat{x}_t^g$ are still Gaussian distributed but have different mean and variance values. Let us consider the mean vector and covariance matrix of $z_n^g$ conditioned on $x_t^g(n) \in \{0,S\}$, which are given as $$E\{z_n^g\} = W_n^g H_n^g E\{\bar{x}_n^g\} = (W_n^g H_n^g)_t x_t^g(n)$$

$$\text{cov}(z_n^g) = W_n^g H_n^g \text{cov}(\bar{x}_n^g)(H_n^g)^H (W_n^g)^H + N_{0,F} W_n^g (W_n^g)^H$$

where $E\{\bar{x}_n^g\}$ is an all-zero vector except its t th element is $x_t^g(n)$, and $\text{cov}(\bar{x}_n^g) = \text{diag}([\sigma_x^2\ \ldots\ \sigma_x^2\ 0\ \sigma_x^2\ \ldots\ \sigma_x^2])$ is a diagonal matrix whose t th diagonal element is zero.

Then, the conditional mean and variance of $\hat{x}_t^g(n)$ are obtained as $$E\{\hat{x}_t^g(n)\} = (W_n^g H_n^g)_{t,t} x_t^g(n),\ \text{var}(\hat{x}_t^g(n)) = (\text{cov}(z_n^g))_{t,t}$$

Using the above found statistics of the MMSE filtered signals, the LLR for the n th subcarrier of t th transmitter for subblock g can be calculated as (12)

$$\lambda_t^g(n) = \ln\left(\sum_{m=1}^{M} - \frac{|\hat{x}_t^g(n) - (W_n^g H_n^g)_{i,t} s_m|^2}{(\text{cov}(z_n^g))_{i,t}}\right) + \frac{|\hat{x}_t^g(n)|^2}{(\text{cov}(z_n^g))_{i,t}}$$

for n=1,2, ..., N, t=1,2, ..., T and g=1,2, ..., G. After the calculation of N LLR values for a given subblock g and transmit antenna t, which results a linear decoding complexity of ~O(M) per subcarrier as in classical MIMO-OFDM, in order to determine the indices of the active subcarriers, the LLR detector (12) calculates the following LLR sums for c=1,2, ..., C according to the look-up table as $d_t^g(c) = \sum_{k=1}^{K} \lambda_t^g(i_k^c)$, where $I^c = \{i_1^c, i_2^c, \ldots, i_K^c\}$ denotes the possible active subcarrier index combinations. The LLR detector determines the active subcarriers for a given subblock g and transmit antenna t as $\hat{c} = \arg\max_c d_t^g(c)$ and $\hat{I}_t^g = \{i_1^{\hat{c}}, i_2^{\hat{c}}, \ldots, i_K^{\hat{c}}\}$. The M-ary symbols transmitted by the active subcarriers are determined with ML detection a $$\hat{S}_t^g(k) = \arg\min_{s_m \in S} |\hat{x}_t^g(i_k^{\hat{c}}) - (W_{i_k^{\hat{c}}}^g H_{i_k^{\hat{c}}}^g)_{t,t} s_m|^2$$

for k=1,2, ..., $K_t$, where these metrics were calculated for the LLR values calculated earlier and do not increase the decoding complexity. After this point, index selecting $p_1$ bits are recovered from the look-up table and M-ary symbols are demodulated to obtain the corresponding $p_2$ information bits.

Figure 3:
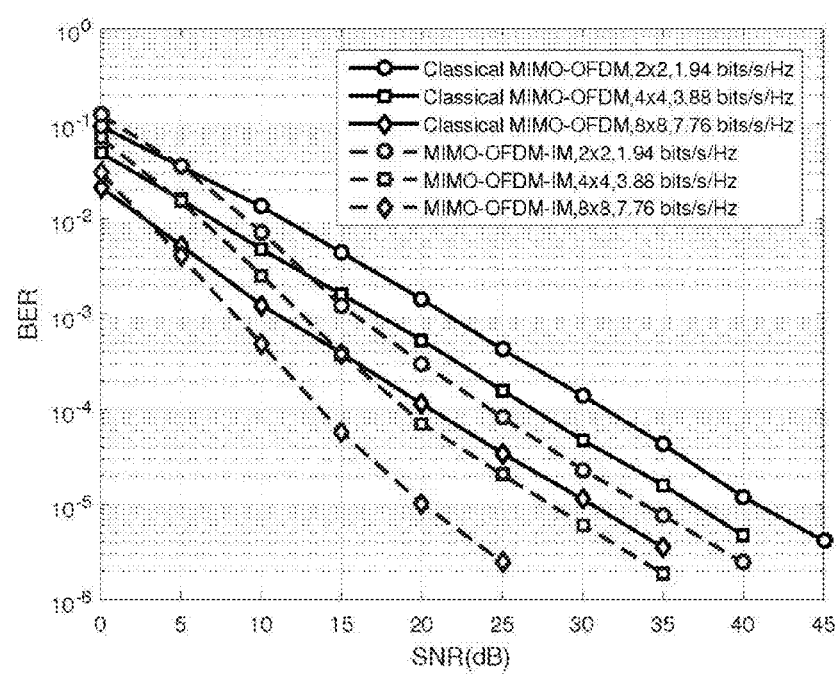
FIG. 3: BER performance of the MIMO-OFDM-IM system for BPSK modulation

In FIG. 3, we compare the bit error rate (BER) performance of the invention for N=4, K=2 with classical MIMO-OFDM for M=2 at same spectral efficiency values. As seen from FIG. 3, the proposed scheme provides significant BER performance improvement compared to classical MIMO-OFDM, which increases with higher order MIMO systems. As an example, the MIMO-OFDM-IM scheme achieves approximately 10.4 dB better BER performance than classical MIMO-OFDM at a BER value of $10^{-5}$ for the 8×8 MIMO system.

Figure 4:
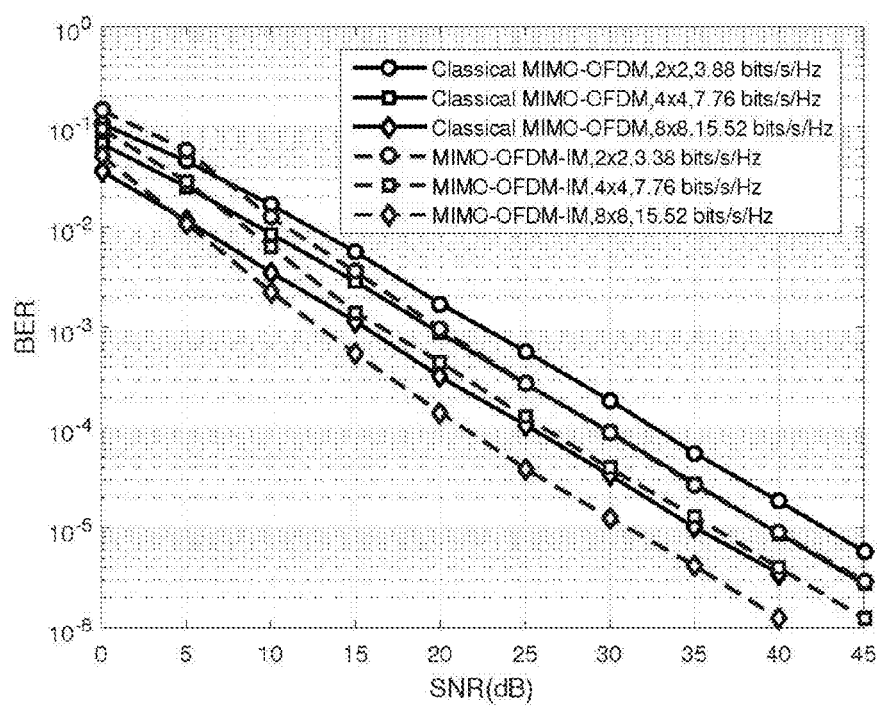
FIG. 4: BER performance of the MIMO-OFDM-IM system for QPSK modulation
Figures 5, 6:
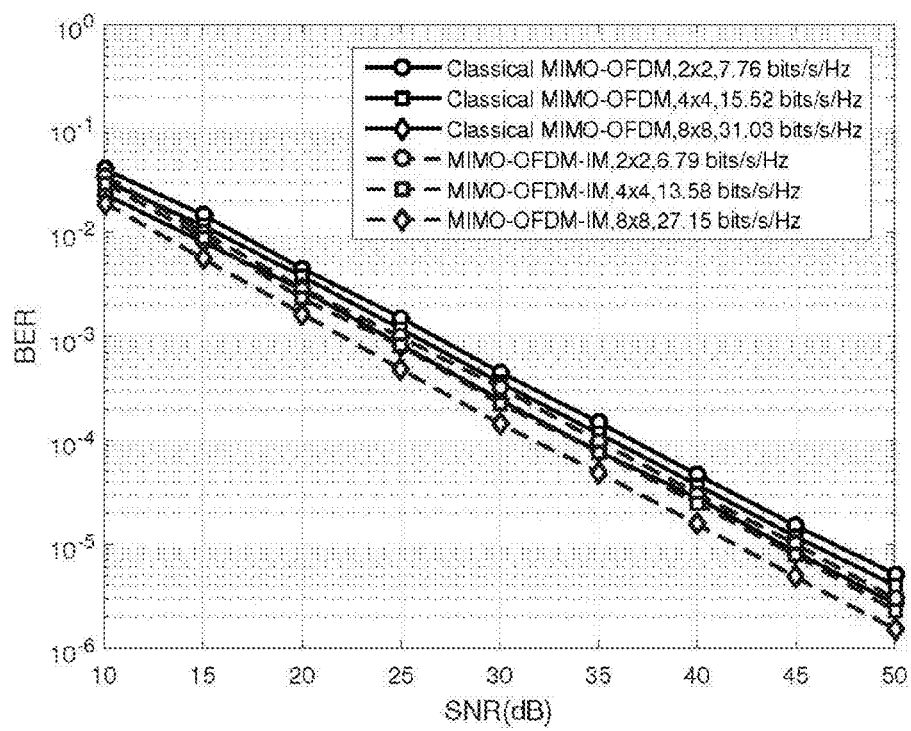
FIG. 5: BER performance of the MIMO-OFDM-IM system for 16-QAM modulation
FIG. 6: Reference Active Indices Selection Table 1

In FIG. 4 and FIG. 5, we extend our simulations to higher spectral efficiency values and compare the BER performance of the proposed MIMO-OFDM-IM scheme (N=4, K=3) with classical MIMO-OFDM for M=4 and 16, respectively. As seen from FIG. 4 and FIG. 5, the proposed scheme still maintains its advantage over classical MIMO-OFDM in all considered configurations. It is interesting to note that the proposed scheme has the potential to achieve close or better BER performance than the reference scheme, even using a lower order MIMO system in most cases.

We claim:
1. A multiple input multiple output orthogonal frequency division multiplexing with index modulation (MIMO-OFDM-IM) communications system, comprising:
   at least two transmit antennas in a transmitter side for transmitting signals obtained after orthogonal frequency division multiplexing with index modulation, wherein each transmit antenna transmits OFDM-IM frames;
   at least two receive antennas in a receiver side for receiving the signals transmitted from the transmit antennas for detection and demodulation;

a block interleaver in the transmitter side, wherein said block interleaver interleaves the OFDM-IM frames to minimize the correlation between channel coefficients corresponding to different OFDM-IM subcarriers;

a successive minimum mean square error (MMSE) detector followed by a plurality of log-likelihood ratio (LLR) detectors in the receiver side to detect and demodulate the OFDM-IM frames transmitted from said each transmit antenna, wherein the successive minimum mean square error (MMSE) detector in the receiver side is configured to eliminate interference between OFDM-IM frames transmitted from said each transmit antenna by performing a filtering process, wherein the successive MMSE detector in the receiver side is configured to have an enhanced operation mode based on ordered successive interference cancellation (OSIC) algorithm and calculates a quality measure for each transmit antenna and starts the detection from the one that has a maximum signal-to-noise ratio;

a wherein a plurality of outputs from the successive MMSE detector are provided as inputs to the plurality of log-likelihood ratio (LLR) detector in the receiver side to perform a search over possible realizations of data symbols for said each subcarriers to calculate a posterior probability ratio, wherein the posterior probability ratio is used as a benchmark for determining whether the corresponding subcarrier of a given transmit antenna is active or not;

a block deinterleaver in the receiver side which deinterleaves the OFDM-IM frames;

wherein each branch of the transmitter side uses reference look-up tables or combinatorial number theory for selection of indices of active subcarriers according to index selection data bits;

wherein a cyclic prefix addition is performed after an inverse fast Fourier transform (IFFT) process on the signals in the transmitter section and a cyclic prefix subtraction is performed after the signals are received at the receive antennas followed by a fast Fourier transform process for the decoupling of the received signals without inter-carrier interference.

2. The multiple input multiple output orthogonal frequency division multiplexing with index modulation (MIMO-OFDM-IM) communications system according to claim 1, wherein the system is configured to adjust the number of active subcarriers.

3. The multiple input multiple output orthogonal frequency division multiplexing with index modulation, MIMO-OFDM-IM communications system according to claim 1, wherein the system is configured to operate for different multiple input multiple output systems.

* * * * *